(No Model.) 4 Sheets—Sheet 1.

A. JOHNSON.
ECCENTRIC COUPLING AND TOOL AND WORK HOLDER.

No. 472,126. Patented Apr. 5, 1892.

Witnesses:
Jean Elliott.
Julia Usler.

Inventor:
Andrew Johnson
by Burton and Burton
his Attorneys.

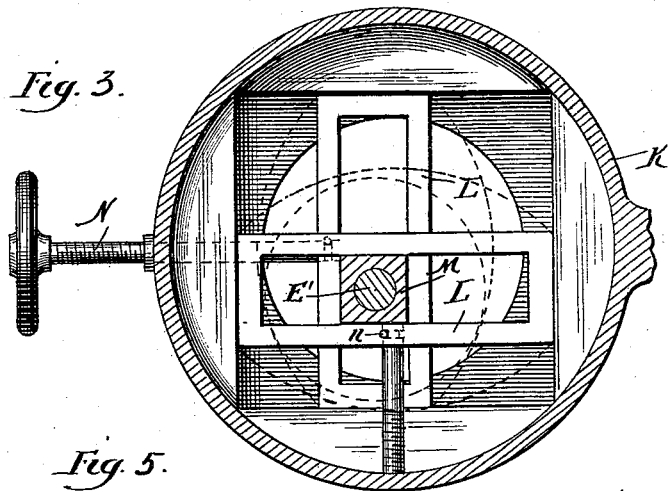
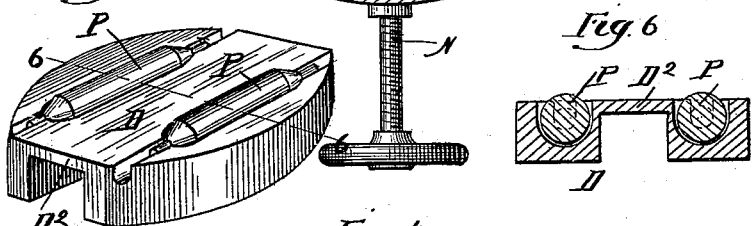
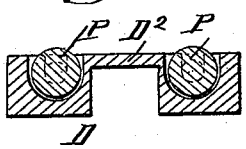
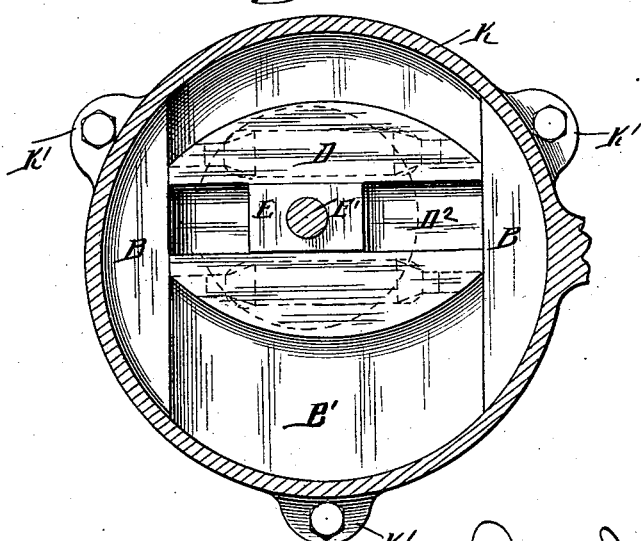

(No Model.) 4 Sheets—Sheet 3.

A. JOHNSON.
ECCENTRIC COUPLING AND TOOL AND WORK HOLDER.

No. 472,126. Patented Apr. 5, 1892.

(No Model.) 4 Sheets—Sheet 4.
A. JOHNSON.
ECCENTRIC COUPLING AND TOOL AND WORK HOLDER.
No. 472,126. Patented Apr. 5, 1892.
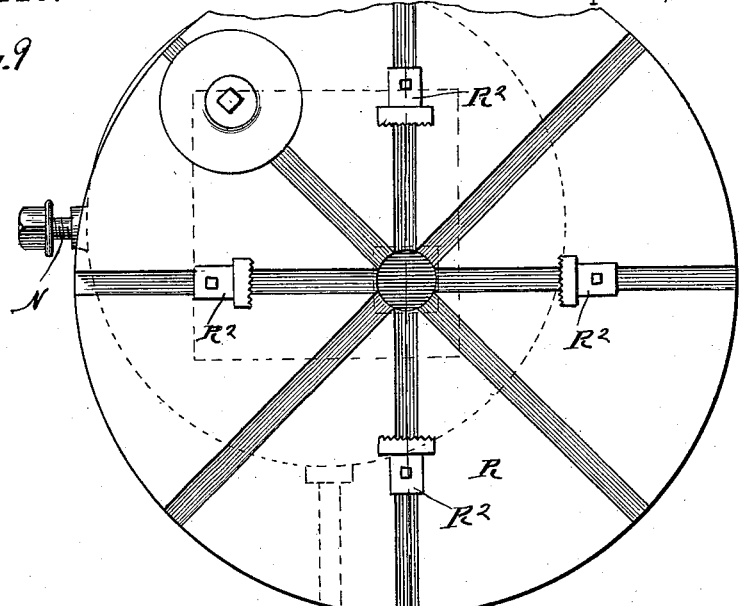
Fig. 9.
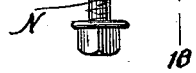
Fig. 10.
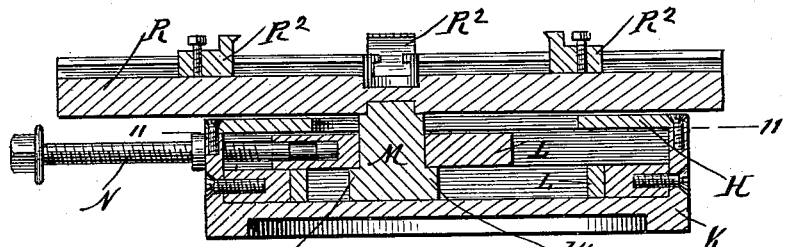
Fig. 11.
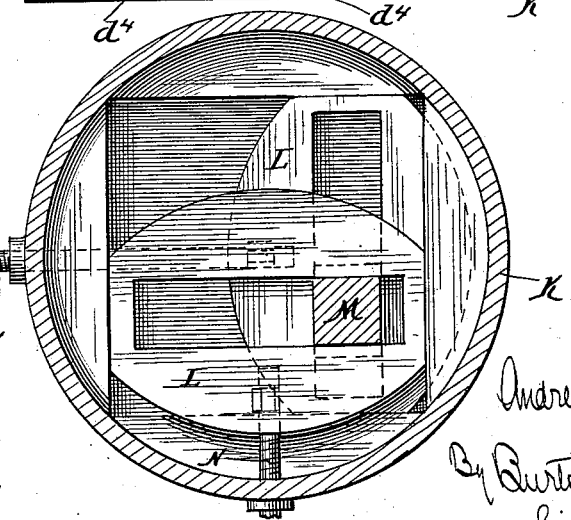
Witnesses:
Jean Elliott
Julia Usler
Inventor:
Andrew Johnson
By Burton & Burton
his Attorneys

UNITED STATES PATENT OFFICE.

ANDREW JOHNSON, OF CHICAGO, ILLINOIS.

ECCENTRIC COUPLING AND TOOL AND WORK HOLDER.

SPECIFICATION forming part of Letters Patent No. 472,126, dated April 5, 1892.

Application filed April 14, 1891. Serial No. 388,893. (No model.)

*To all whom it may concern:*

Be it known that I, ANDREW JOHNSON, a citizen of the United States, residing at Chicago, county of Cook, and State of Illinois, have invented certain new and useful Improvements in Eccentric Coupling and Tool and Work Holders, which is fully set forth in the following specification, reference being had to the accompanying drawings, forming a part thereof.

This invention is an improvement in the details of construction of a device for which patent has been allowed me upon application, Serial No. 349,493, filed April 25, 1890.

Figure 1:
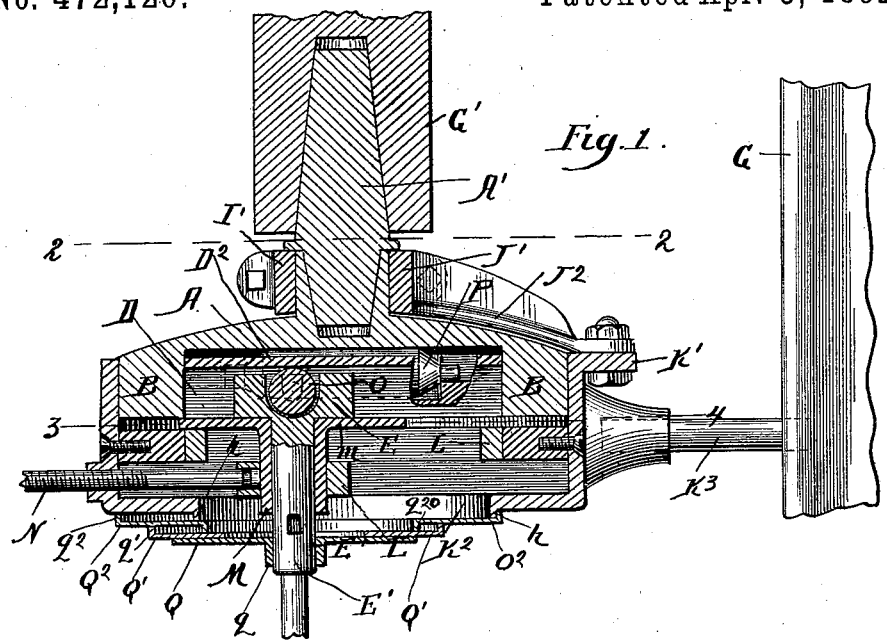
Figure 2:
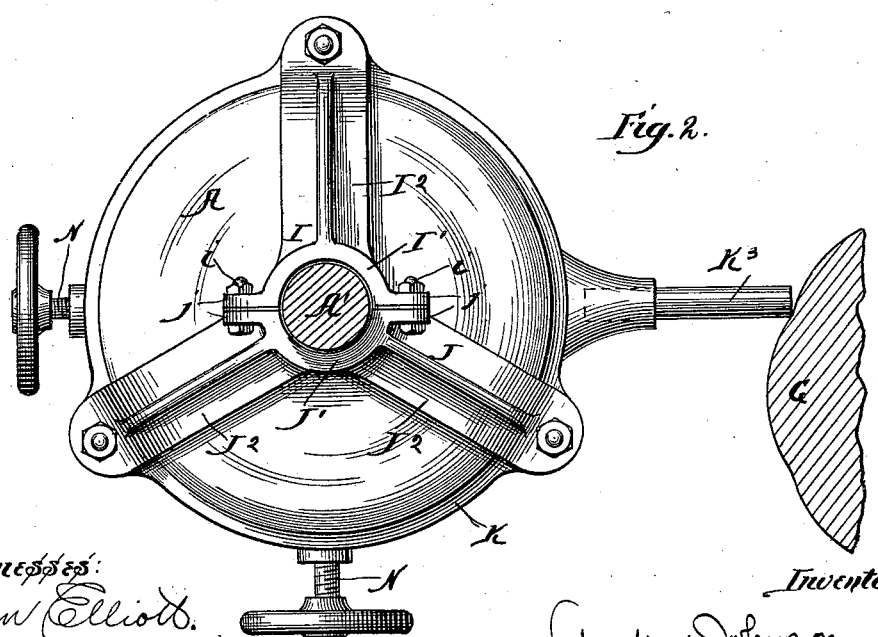
Figure 8:
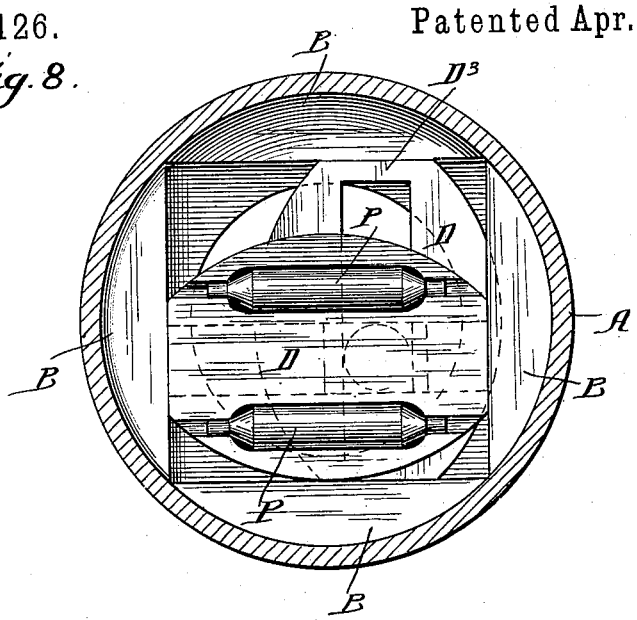
Figure 7:
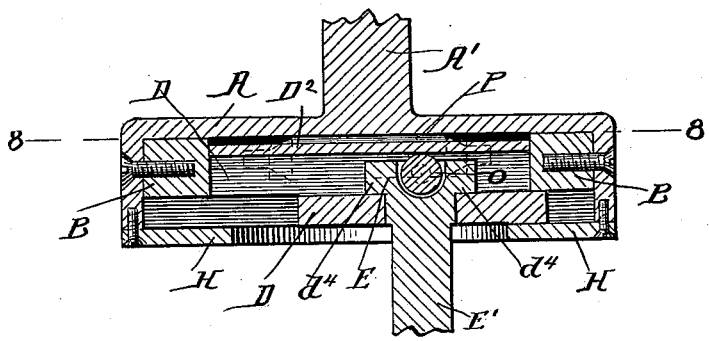

In the drawings, Figure 1 is a vertical section through the axis of the revolving head of a drill-press in which a tool-holder embodying my invention is represented as secured. Fig. 2 is a plan of the same, section being made at the line 2 2 on Fig. 1. Fig. 3 is a section at the line 3 4 on Fig. 1 looking downward. Fig. 4 is a section at the same plane looking upward. Fig. 5 is a perspective of an important element in my invention hereinafter called the "trammel." Fig. 6 is a transverse section of the trammel at the line 6 6 on Fig. 5. Fig. 7 is an axial section through a device embodying my invention and adapted for communicating rotary motion from one of the spindles or shafts shown therein to the other spindle or shaft without regard to said shafts being in line. It may be used as a tool-holder for any other purpose and differs from the construction shown in the preceding figures in that it contains two trammels instead of one, this difference, however, having no relation to the fact that it is not limited to the use of the tool-holder. Fig. 8 is a section at the plane indicated by the line 8 8 on Fig. 7. Fig. 9 is a plan of a work-holder embodying my invention, adapted to be used as a horizontal bed or vertical chuck. Fig. 10 is a vertical section at the line 10 10 on Fig. 9. Fig. 11 is a section at the line 11 11 on Fig. 10, being virtually a plan or elevation of the interior mechanism, section cutting only the stem or spindle of the disk or plate which has the work-holding jaws.

I will first describe the construction illustrated in Figs. 1 to 6, inclusive, since all the essential elements of the invention are presented in those figures, together with many details of construction which are preferably, though not fundamentally, essential.

A is the base-plate, which is designed to be rigid at its center with the shaft, and when the device is the tool-holder illustrated in Figs. 1 to 6, inclusive, this base-plate has the spindle A' projecting from its center, adapting it to be secured in the usual manner in a revolving shaft having a central tapering socket. Such shaft is represented at G', being the revolving shaft of a drill-press, a portion of whose upright frame is represented at G. This base comprises, preferably as rigid with it, cheeks B B, whose proximate edges are parallel, so that there is formed between them an opening or channel B', in the base of which said cheeks form a part. The center of this channel corresponds to the axis of the shaft or spindle A' of the base.

D is a "trammel," as I name it. As illustrated in Figs. 1, 3, 5, and 6, it is an oblong block or frame having formed through it a channel or opening having two opposite sides parallel. This trammel in length corresponds to the width of the channel B' in the base, and it is placed in said channel with its length extending across said channel and it is adapted to slide in the channel longitudinally with respect to the latter, but sidewise with respect to the trammel itself, being guided by its ends following the parallel sides of the channel. The essential characteristic of this trammel is that its opening or channel has two opposite parallel sides, whose direction is transverse to the opposite parallel sides of the channel or opening in the base. For some purposes these two opposite parallel sides may be connected as in the structure shown in Figs. 5 and 6 by the bottom $D^2$, and for other purposes. Said sides may be connected by the ends $D^3$, which appear in similar trammels shown in Fig. 8. When the device is applied in such manner that there is an end-thrust experienced by the shaft to which motion is communicated through this mechanism, I prefer to adopt the former construction—that is, giving the trammel a bottom to connect its parallel sides—because by that means I am able to use the anti-friction roller in the trammel-block, which will now be described. E is such trammel-block. It is a solid block of metal having two opposite sides parallel and coinciding with the parallel sides of the channel or opening in the trammel D, in which the block fits, and is adapted to slide in the channel. This trammel-block rotates the shaft E', said shaft being the one to which the motion is communicated, and for most purposes to which this device may be applied said shaft is made rigid with the block E, and is so represented in the construction shown in Figs. 1 to 6. Obviously, however, the shaft might slide through a polygonal or feathered opening in the block, so as to be rotated by it. The parts thus far described comprise what is essential to the transmission of the rotary motion from one shaft to another parallel but eccentric to the first, the appliance needing, in addition, only a suitable face-plate to prevent the accidental escape of the trammel-block from the trammel or of the trammel from the base. In the simplest form, but with two trammels instead of one, it is illustrated in Figs. 7 and 8, H being the face-plate to retain the trammel-block and trammel in place. When a second trammel is employed, it is located transversely with respect to the first trammel, and the base is provided with an additional pair of cheeks B, whose parallel faces are in a direction transverse to that of the faces of the first pair—that is, the two trammels lie crossing each other—and are guided in transverse directions by similar pairs of cheeks, which form part of the base, either by being integral or being rigid therewith, and the trammel-block is made long enough so that it extends through both the trammels and is parallelogrammic in cross-section—that is, it has a pair of opposite sides corresponding to the parallel sides of each of the trammels, so that it receives guidance from both of them. It will be observed that in this construction the guidance which either of the trammels gives to the trammel-block corresponds perfectly to the guidance which the other trammel-block receives from the base, so that the additional trammel is merely a further safeguard against inaccurate operation, the trammel-block having thus two means of guidance in each direction—to wit, the guidance of one of its parallel sides in one of the trammels and the guidance of the other trammel in the base.

In order to prevent the trammel-block from escaping from the base in the simple form of construction shown in Figs. 7 and 8, which does not include an adjustable bearing for the shaft E', I employ the face-plate H, which is a ring secured to the cheeks B, and thereby to the base A, which overlaps the cavity in the base far enough to engage under or in front of the ends of the trammel, or when there are two trammels in front of the ends of the outermost or lower of them, and when there are two trammels the trammel-block is prevented from escaping by being provided with flanges $d^4 d^4$, which engage over or behind the edges of the outermost or lower trammel, said trammel being itself retained by the face-plate ring H and retaining the trammel-block by engaging with its said flanges $d^4$. There are other obvious means of preventing the escape of the parts, and I show these merely as illustrations.

The improvements in the structure thus far described over that shown in my application Serial No. 349,493, above mentioned, are as follows: The base has a channel formed entirely across it to guide one of the trammels, instead of having a four-sided cavity formed in it to guide both of them, and when two trammels are employed the guidance for the other trammel is afforded by an additional pair of cheeks transverse to those which bound the first channel and not in the same plane, but rigid with respect to the base and with respect to the first pair of cheeks, such rigidity being secured conveniently by securing the cheeks of both pairs to an annular flange or wall $a$ of the base A, as seen in Figs. 7 and 8. This change of form permits me to utilize the entire segmental portion of the circular cross-area of the base, which lies outside the guide-line of each trammel when it is at the extreme of its sliding movement in the base, for substance which may be given to the sides or side bars of the trammel, increasing their strength and rigidity and affording more material in which to obtain connection with them to adjust them when they are used for purposes of adjustment, as further explained, and as illustrated in Figs. 3, 10, and 11.

In Fig. 3 I have illustrated in full lines the trammels made with narrow side bars, not taking advantage of this available space, and in dotted lines the full size possible by taking advantage of said space, in order to make clear this difference, which may also be seen clearly by comparing the trammels as shown in Figs. 4, 5, and 11 with those illustrated in full lines in Fig. 3. There is also an advantage of cheapness in construction arising from channeling the base entirely across, as compared with the difficulty and expense of making a cavity or opening through it.

It will be understood that, as set forth in my said former application, the parts assembled in the manner described will transmit rotary motion from the shaft A' to the shaft E', eccentric thereto, each of said shafts being retained in a suitable bearing, so as to have a fixed axis of revolution, because as the shaft A' revolves and carries with it bodily the trammel or trammels, swinging them about its axis, said trammels will tend to carry, also, the trammel-block; but said trammel-block, having its axis fixed by the bearings of the shaft E', cannot be carried bodily, so that the trammels, in order to continue their rotation with the base, must slide in the latter in one direction while they slide on the trammel-block in a transverse direction; but such sliding does not prevent the trammels from turning around as the base rotates them about its own center, and so turning they will of necessity rotate the trammel-block, which can rotate only about its own axis.

A further improvement over my former application is shown in Fig. 1 and the other figures which illustrate the same construction, wherein I have shown as part of the same appliance an adjustable bearing for the shaft E' of the trammel-block and means for adjusting it, while the shaft A' and all the parts carried by it are rotated without interrupting such rotation. These I will now describe.

I and J are respectively corresponding parts of a spider or frame, which comprise the collar I' J', half of which is on the part J and half on the part I, said parts being secured by the bolts $i$ through the lugs $j$. From this collar there are extended the diverging arms $I^2$ upon the part I and $J^2$ upon the part J, the ends of said diverging arms extending beyond the circumference of the base A.

K is a cup or upwardly-opening case corresponding in diameter to the base A. At its upper margin it has the lugs K' K' K', corresponding in position to the overhanging ends of the arms $I^2 J^2$ and adapting the said cup or case K to be secured rigidly to said spider I J. The collar I' J' fits loosely upon the spindle or shaft A' above the base A, so that said shaft or spindle can revolve and carry the base A and all the parts which are actuated by it without rotating the cup or case K or its supporting-spider I J. The bottom of the cup or case K has a circular opening $K^2$ as large as the possible range of the shaft E' with respect to the axis of the shaft A'. I provide the case K with a laterally-projecting arm $K^3$, which extends to any fixed obstruction which may serve as a stop to prevent the rotation of the case K by mere friction with the rotating base A.

When the device is used as a tool-holder in a drill-press, as is intended to be illustrated in Fig. 1, the stop in question consists of the upright standard or frame of the press G.

In the case K, I provide two trammels L L, guided by suitable cheeks and extending transversely to each other, substantially as in the construction illustrated in Figs. 7 and 8, and a trammel-block M extending through said trammels at their intersection in the same manner as above described with respect to Figs. 7 and 8; but instead of the flanges $d^4$ $d^4$ I provide this trammel-block with a circular flange $m$, which overhangs the upper trammel and may extend and, as illustrated, does extend over the guide-cheeks for said upper trammel, these flanges serving the same purpose as the flanges $d^4$ in the other construction—viz., upholding the trammel-block; but, in addition, it may serve the further purpose of supporting the trammel-block E, if the latter is not rigid with the shaft E', and also supporting the trammel D, if, instead of being formed with a bottom, such trammel is made open, so that it is not upheld by the trammel-block. This trammel-block is provided with a central circular opening, through which the shaft E' protrudes and in which it is adapted to revolve. Through the lateral wall of the case K are screwed two screw-shafts N N, which engage, respectively, at their inner ends with the trammels L L, being connected to said trammels in any convenient manner which will permit the shafts to revolve at such engagement, but be longitudinally inseparable from the trammels, so that as they revolve and are thereby longitudinally actuated through the wall of the case K they will cause the trammels, to which they are connected, respectively, to slide in their respective guides in the case K. As illustrated, this connection is made by means of an annular groove in the shafts near the end where they enter the trammels and a pin $n$, set through the trammels, respectively, and passing through said annular groove, making a feather, which is engaged in the groove. It will be understood from inspection of this construction that by rotating the shafts N by means of the handles attached thereto the trammels L L may be shifted, each independently of the other, whereby the center of the trammel-block may be shifted to any position within the range of the adjustability of either trammel. These trammels correspond in their range of adjustment to the actuating-trammel D in one direction and to the range of movement of the trammel-block E in the trammel D in the other direction, so that by means of said screws N the trammel-block M, and thereby the shaft E', which is journaled in it, may be held at any point within the range within which the said shaft E' can be rotated by means of the mechanism comprising and contained in the rotating case A, above described. Since the shaft E' will revolve with substantially equal facility wherever it stands within the range of action of the device, as above described, it may be shifted while in action, and a tool carried by it may thereby be made to trace any course upon the work placed beneath it, so that a milling-tool, for example, secured to the downwardly-protruding ends of the shaft E' by any familiar means may be shifted while it continues to revolve and made to dress off any irregular edge or made to cut an irregular passage in a plane surface, and a rotary engraving-tool, similarly held, may be made to trace any pattern on a surface exposed to its action.

When this device is employed in a drill-press or in any way in which there is an end thrust or resistance tending to produce pressure longitudinally with respect to the shaft E' toward the shaft A', it is desirable to reduce the friction of the trammel and trammel-block to the minimum, since their sliding motion in their guideways, respectively, in case of a rapid motion of the tool, is quite rapid, and if it were also under heavy pressure by reason of such end thrust or pressure would not only rapidly deteriorate the device, but would also cause it to require an unnecessary amount of power. For this purpose I prefer, as above stated, to make the trammel with a bottom $D^2$, or top or back, according to the position in which the device is operated—that is, with a web connecting its opposite sides extending in a plane across the axis of the shaft $E'$, which will receive the end-thrust referred to—and in that case I provide the anti-friction roller O, suitably journaled in the end of the trammel-block E, the axis of said roller being transverse to the channel in which said block moves in the trammel, so that the friction of the block in the trammel under end-thrust of the shaft $E'$ is diminished by being largely reduced to rolling friction. For a similar purpose I provide recesses in the upper side of the trammel, in which are lodged the anti-friction rollers P P, which, being interposed in the same manner between said trammel and the base toward which it is forced by the end-thrust, will diminish the friction which will be caused between said parts in the movement of the trammel. When two trammels are used, as in Figs. 7 and 8, it is evident that in case of end-thrust requiring the anti-friction rollers described, the lower or outer trammel will not require any such device, because it will not receive the end-thrust, but will be simply and solely a lateral guide, because such trammel is necessarily made open through from top to bottom to permit the trammel-block to pass through and become properly engaged with the other trammel.

When this device is used as a means of holding work in a bed or in a fixed head, or in a revolving head or lathe, or in any position where it is desirable to be able without detaching work from its fastenings to adjust it to receive the action of a tool at a different point, or, to revolve about a different center, the construction adopted is substantially that which constitutes the lower part of the device shown in Fig. 1 and seen in sectional plan in Fig. 3, contained in the case K; but I have further illustrated it to show its specific adaptation to the modified purpose in Figs. 8, 9, and 10, wherein there is illustrated a base and two trammels, both being open trammels like the lower trammel in Figs. 7 and 8, and a trammel-block extending through said trammels and having at its upper end, either rigid with it or at least so that it cannot rotate with respect to it, a plate or bed R, provided with jaws $R^2$ of familiar construction for grasping work which may thus be secured in position to receive the action of a tool. In this construction the screw-shafts N N preferably are without exterior handles, but are adapted to be operated by a wrench; but such handles may be used.

The base of this device may be adapted in any suitable manner to be secured to the bed of a drill-press or to a fixed or revolving head of a lathe. The mode of use of this device and the details of its construction which adapt it to such use will be obvious to mechanics without further description. The segmental form of the sides of the trammels and the mode of construction which permits it to constitute the chief difference between this adaptation of my invention to the purposes of a work-holder and the corresponding adaptation of it to the same purpose in my said former application.

In order to prevent the entrance of chips from the work into the case which contains the devices for controlling the position and movement of the tool-holder, a cover-plate may be provided to move with the tool-holder shaft $E'$. If this cover-plate were made in one piece, it would be necessary that its diameter should be nearly twice that of the opening through the face-plate H, or in form shown in Fig. 1, double the opening of the diameter $K^2$ in the bottom of the case K, and since such size would be inconvenient I make this cover of several annular parts Q Q' $Q^2$, the part Q being the central one, having a part $q$, by which it is fastened to the shaft $E'$, the next annulus Q' having its opening not greater than the sum of the radius of the part Q, added to the radius of the shaft $E'$, so that while the shaft is at one side of the opening of the part Q', the opposite edge of the cover-plate Q will still extend beyond the farther edge of the opening in the part Q'. The part $Q^2$, still larger than the part Q', has its opening bearing relation to Q' similar to that which Q' sustains to Q—viz., that the diameter of said opening is not greater than the sum of the radius of Q' added to the radius of $E'$. A small marginal flange $h$ projects downward from the bottom of the face-plate, or, in Fig. 1, the bottom of the case K at the margin of the opening $K^2$, and the cover-plate $Q^2$ has an upwardly-projecting flange $q^2$ at its outer margin to engage said flange $h$, and at its inner margin a downwardly-projecting flange $q^{20}$, which engages an upwardly-projecting flange $q'$ at the outer margin of the plate Q'. The engagement of these flanges causes the center plate Q to carry with it the plate Q', and the plate Q' to carry with it the plate $Q^2$ in the lateral movements, which result from adjustment above described, to vary the position of the axis of the shaft Q'. These plates thus in a manner similar to telescoping shafts keep the opening through the face plate or case covered at all positions without having inconvenient lateral extent.

I claim—

1. In combination with the base having a channel extending across it, bound by two cheeks whose proximate faces are parallel, a trammel located in such channel and extending across it from one of the parallel sides to the other, and guided by said parallel sides, such trammel having a channel extending through it from end to end transverse to the channel in the base, and a trammel-block sliding in said trammel in the channel and guided by its parallel sides, substantially as set forth.

2. In combination with the circular base having two parallel cheeks bounding a channel across it, and the trammel located in such channel and extending between its opposite parallel sides and guided thereby as it moves longitudinally in the channel, such trammel having a channel with two parallel sides whose direction is transverse to that of the parallel sides of the channel in the base, such trammel having its outer boundary conforming substantially to the arc of the circumference of the base, whose chord is a line connecting the corresponding ends of the opposite cheeks, substantially as set forth.

3. In combination with a cylindrical case, two pairs of segmental cheeks secured within the case to the cylindrical wall thereof, the individuals of each pair having their straight faces parallel and in planes transverse to the like faces of the other pair, said pairs of cheeks being at different longitudinal positions along the axis of the case, whereby the channel which each pair forms is not limited in length by the other pair, substantially as set forth.

4. The base adapted to be secured at its center in a bearing or to a revolving shaft and having an opening or channel with two opposite parallel sides, a trammel located in such opening or channel and extending between such parallel sides and guided thereby when sliding in such opening or channel, such trammel having an opening or channel with two opposite parallel sides whose direction is transverse to that of the parallel sides of the opening or channel in the base, and a trammel-block sliding in said opening or channel in the trammel and guided by the parallel sides thereof and protruding from the trammel and base and adapted at such protruding part to be journaled and rotated in a bearing, combined with the case K, fixed with respect to the bearing of the base, and the two trammels L L, located and guided therein transversely to each other, and a second trammel-block extending through and adapted to slide in and be controlled by the trammels L L and having a bearing for the protruding end of the first trammel-block, and the screws which control the position of said trammels L L in the case, substantially as set forth.

5. The base adapted to be secured at its center in a bearing or to a revolving shaft and having an opening or channel with two opposite parallel sides, a trammel located in such opening or channel and extending between such parallel sides and guided thereby when sliding in such opening or channel, such trammel having an opening or channel with two opposite parallel sides whose direction is transverse to that of the parallel sides of the opening or channel in the base, and a trammel-block sliding in said opening or channel in the trammel and guided by the parallel sides thereof and protruding from the trammel and base and adapted at such protruding part to be journaled and rotated in a bearing, combined with the case K, and the spider or frame I J, journaled on the spindle of the base and extended outside of its periphery and secured to and supporting the case, the trammels L L and a second trammel-block controlled thereby, and the screws which control the trammels, all substantially as and for the purpose set forth.

6. In combination with the base having an opening or channel which has two opposite parallel sides, a trammel located in such opening or channel and extending between such parallel sides and guided thereby in such channel or opening, such trammel having an opening or channel with two parallel sides whose direction is transverse to that of the parallel sides of the opening or channel in the base, and a trammel-block sliding in said opening or channel in the trammel and guided by its parallel sides, and anti-friction rollers interposed between the base and the trammel, substantially as set forth.

7. In combination with the base having an opening or channel which has two opposite parallel sides, a trammel located in such opening or channel and extending between such parallel sides and guided thereby in said channel or opening, such trammel having an opening or channel with two parallel sides whose direction is transverse to that of the parallel sides of the opening of the channel in the base, and a trammel-block sliding in said opening or channel in the trammel and guided by its parallel sides, and anti-friction rollers interposed between the trammel and trammel-block, substantially as set forth.

8. In combination with the base having an opening or channel which has two opposite parallel sides, a trammel located in such opening or channel and extending between such parallel sides and guided thereby in said channel or opening, such trammel having an opening or channel with two parallel sides whose direction is transverse to that of the parallel sides of the opening or channel in the base, and a trammel-block sliding in said opening or channel in the trammel and guided by its parallel sides, and anti-friction rollers interposed between the base and the trammel and between the trammel and the trammel-block, substantially as set forth.

In testimony whereof I have hereunto set my hand, at Chicago, Illinois, in the presence of two witnesses, this 31st day of March, 1891.

ANDREW JOHNSON.

Witnesses:
CHAS. S. BURTON,
JEAN ELLIOTT.